(12) United States Patent
Koncz et al.

(10) Patent No.: US 11,911,895 B2
(45) Date of Patent: Feb. 27, 2024

(54) TOOL GRIPPING DEVICE FOR GRIPPING A BENDING TOOL WITH A ROBOT

(71) Applicant: PMT SZERSZÁMGÉP ZRT., Csongrád (HU)

(72) Inventors: Edvárd László Koncz, Csongrád (HU); János Pekárik, Hódmezővásárhely (HU); István Major, Csongrád (HU); Viktor Somodi, Csongrád (HU)

(73) Assignee: PMT SZERSZÁMGÉP ZRT., Csongrád (HU)

( * ) Notice: Subject to any disclaimer, the term of this patent is extended or adjusted under 35 U.S.C. 154(b) by 0 days.

(21) Appl. No.: 18/032,028

(22) PCT Filed: Dec. 14, 2021

(86) PCT No.: PCT/HU2021/050071
§ 371 (c)(1),
(2) Date: Apr. 14, 2023

(87) PCT Pub. No.: WO2022/129964
PCT Pub. Date: Jun. 23, 2022

(65) Prior Publication Data
US 2023/0286176 A1    Sep. 14, 2023

(30) Foreign Application Priority Data

Dec. 16, 2020   (HU) .................................. P2000433
Dec. 7, 2021    (HU) .................................. P2100423

(51) Int. Cl.
*B25J 15/08*      (2006.01)
*B25J 9/14*       (2006.01)

(52) U.S. Cl.
CPC .............. *B25J 15/08* (2013.01); *B25J 9/14* (2013.01)

(58) Field of Classification Search
CPC ... B25J 15/08; B25J 9/14; B25J 11/005; B25J 15/0019; B21D 5/0254; B21D 5/0245
See application file for complete search history.

(56) References Cited

U.S. PATENT DOCUMENTS 6,656,099 B1   12/2003   Akami et al.
7,632,224 B2   12/2009   Rouweler et al.
(Continued)

FOREIGN PATENT DOCUMENTS

WO    2017139819 A1    8/2017

OTHER PUBLICATIONS

ISR for International Application No. PCT/HU2021/050071 dated Apr. 28, 2022.
(Continued)

*Primary Examiner* — Stephen A Vu
(74) *Attorney, Agent, or Firm* — Ladas & Parry LLP

(57) ABSTRACT

The subject of the invention is a tool gripping device for gripping a bending tool with a robot, the cylindrical enclosure of which is secured to the base plate and equipped with a compressed air connection, while a cylinder head equipped with a compressed air connection is secured to the end of the enclosure opposite the base plate. A clamping element movable with compressed air is arranged in the enclosure, with the conical end of the clamping element extending out of the enclosure through the aperture of the cylinder head. A gripper is led through the hole drilled through the clamping element, the clamp shank of which is secured to the base plate, with a support head fixed eccentrically to the end of the grip stem extending out of the clamping element.

13 Claims, 9 Drawing Sheets

(56) References Cited

U.S. PATENT DOCUMENTS

| | | | | |
|---|---|---|---|---|
| 8,443,646 B2 * | 5/2013 | Pelech | ................. | B21D 5/0272 |
| | | | | 72/448 |
| 8,496,255 B2 * | 7/2013 | Rouweler | ............ | B21D 5/0209 |
| | | | | 279/119 |
| 9,199,296 B2 * | 12/2015 | Busch | .................. | B21D 43/003 |
| 9,211,578 B2 * | 12/2015 | Hayashi | ................. | B21D 37/14 |
| 9,962,749 B2 * | 5/2018 | Morgan | ............... | B21D 5/0254 |
| 2018/0311720 A1 | 11/2018 | Cavicchia et al. | | |

OTHER PUBLICATIONS

Written Opinion for International Application No. PCT/HU2021/050071 dated Apr. 28, 2022.

* cited by examiner

A - A metszet

TOOL GRIPPING DEVICE FOR GRIPPING A BENDING TOOL WITH A ROBOT

CROSS REFERENCE TO RELATED APPLICATIONS

This application is a U.S. National Stage Application under 35 U.S.C. § 371 of International Application No. PCT/HU2021/050071 which was filed on 14 Dec. 2021, which claims priority from Hungary Applications Nos. P2000433 filed 16 Dec. 2020 and P2100423 filed 7 Dec. 2021 the disclosures of which are incorporated in their entirety by reference herein.

TECHNICAL FIELD

The subject of the invention is a tool gripping device for gripping a bending tool with a robot, allowing for easily and quickly gripping and moving various types of bending tools by means of the tool gripping device mounted on a robot arm, with the use of a subsequently implemented connection point.

BACKGROUND

One of the essential steps of sheet metal machining processes is the selection of appropriately designed bottom and top bending tools, and inserting and fixing these bending tools in the tool clamp. Currently, the devices developed for replacing the bending tools for robotic bending machines are not designed to be compatible with all commercially available types of bending tools and their various clamping systems. To the best of our knowledge, robotic gripping units can currently only be procured for a single type of commercially available bending tools in the entire world; a few unique devices are also available from the manufacturers of bending machines, but these are not commercially available. Two thirds of the bending machines worldwide are marketed using a US (European Standard) tooling system, which is not compatible with any robotic solution. The situation is similar for other types of bending tools as well. A considerable number of users are thus excluded from automation.

U.S. Pat. No. 7,632,224 B2, known from the state of the art, describes an interchangeable tool consisting of a tool body equipped with a receiving end, where the receiving end is used to secure the tool in a receiving device. Coupling elements are arranged in the tool body in such a way as to provide non-rotating connections for the manipulator that inserts the tool into and removes the tool from the receiving device.

U.S. Pat. No. 6,656,099 B1 describes a plate bending machine furnished with a bending tool and a tool replacing device equipped with a hook including a spline and a clench. The bending tool is equipped with a locking device supplemented with a clamping element. The bending machine constitutes a single unit with the bottom and top tool holders; they are responsible for moving the bending tools. The tool replacing device transfers the bending tools into the tool clamp.

International Publication Document no. WO 2018/138598 A1 describes a plate bending machine equipped with a tool magazine for storing bending tools, and a robot. The robot selects the bending tools with the gripping element coupled to its arm, in the order defined by the controller, and places them on the tool storage rod. Next, the gripping arm is replaced on the robot arm, after which the new gripping arm inserts the bending tools in the tool clamps of the bending machine, by means of the tool storage rod.

The bending machine presented in International Publication Document no. WO 2013/166538 A1 is equipped with a bending tool replacing device, a robot including a gripper, and a tool magazine. The robot removes the bending tools from the tool magazine holders, and places them onto the tool holder and into the tool clamp. Sensors assist in the accurate insertion of the bending tools.

The disadvantage of the solutions described and applied in practice is that the users manufacture tool gripping devices only for their own self-made bending tools, which are very sophisticated, expensive, and are not commercially available.

SUMMARY

The primary purpose of our invention is to provide a tool gripping device allowing for the gripping of bending tools of different makes and designs independent of their clamping system, and furthermore allowing for removing the bending tool from the tool magazine, inserting said bending tool into the tool clamp of the bending machine, and removing said bending tool from the tool clamp of the bending machine and reinserting it into the tool magazine.

An additional purpose of our invention is to create a tool gripping device that can be manufactured in a cost-effective manner, with less expensive required tool modifications than for the other devices available in the market, and having simple operation, use and maintenance.

During the tests carried out during the design process for the tool gripping device comprising the invention, we recognized that a bending tool can only be gripped firmly by a robot and moved accurately by robotic control if the bending tool has an aperture for gripping, wherein the gripping structural element of the device can be impacted against a support surface, and another structural element of the bending tool can be clamped onto the support surface providing the impact.

We also recognized that if the tool gripping device was implemented as a pneumatic cylinder actuated by the pneumatic system of the robot, the structural element for clamping and releasing the bending tool could be a piston, making linear movements back and forth.

Keeping this objective in mind, our invention is a tool gripping device that can be attached to a robot arm by means of adapters. The device has an enclosure with a base plate mounted to the end near the robot arm, and a cylinder head mounted to the other end of the enclosure. The enclosure and the cylinder head are equipped with compressed air connections, which allow the device to operate as a pneumatic cylinder.

Inside the enclosure is a cylindrical clamping element consisting of a piston-like clamp head supplied with an eccentric clamp stem, wherein the clamp stem implemented with a conical end is led through the sealed aperture of the cylinder head. The clamping element can be moved back and forth in the enclosure by means of compressed air, causing the clamp stem to extend out of the cylinder head or retract back into the enclosure. A drill hole extending through the clamping element, arranged symmetrically to the clamp head and eccentrically to the clamp stem, wherein the section of said drill hole within the clamp stem is combined with a groove.

A gripper with a circular cross-section grip stem and a support stem also having a circular cross-section (but larger in diameter) are mounted to the base plate. An oval shaped support head is mounted to the end of the grip stem with a bolt for clamping the bending tool. The support stem and the grip stem are led through the eccentric drill hole extending through the clamping element. A guide pin is clamped into the grip stem at the end of the support stem, which is installed in the groove of the clamp stem in order to guide the gripper.

The bending tool, the pneumatic actuating device, and their controls do not constitute the subject matter of the invention.

The purpose of the invention can be achieved by means of the device described in claim 1, the optimum ways of implementing them being included in the sub-claims.

BRIEF DESCRIPTION OF DRAWINGS

The invention is described in detail with reference to the enclosed drawings, in which FIG. 1 displays the side view of the connection of one of the implementation designs of the tool gripping device comprising the invention to the robot, FIG. 2 displays the tool gripping device in cross-section, prior to clamping a bending tool, FIG. 3 displays the tool gripping device in cross-section, while clamping a bending tool, FIG. 4 displays the tool gripping device in exploded view, from one particular viewing direction, FIG. 5 displays the tool gripping device in exploded view, from a different viewing direction, FIG. 6 displays the connection between the base plate and the gripper, in exploded view, FIG. 7 displays the structure of the gripper, in exploded view, FIG. 8 displays the drawing of the cylinder head, in exploded view, FIG. 9 displays the structure of the clamping element, in exploded view, FIG. 10 displays one of the implementation designs of the bending tool, FIG. 11 displays the perspective sectional drawing of one of the implementation designs of the bending tool, FIG. 12 displays the perspective sectional drawing of one of the implementation designs of the bending tool, from a different viewing direction, FIG. 13 displays another implementation design of the bending tool, FIG. 14 displays the side view of the connection of a different implementation design of the tool gripping device comprising the invention to the robot, FIG. 15 displays the tool gripping device indicated in FIG. 13 in cross-section, prior to clamping a bending tool, and FIG. 16 displays the drawing of the cylinder head of the tool gripping device indicated in FIG. 13, in exploded view.

DETAILED DESCRIPTION

Figure 1:
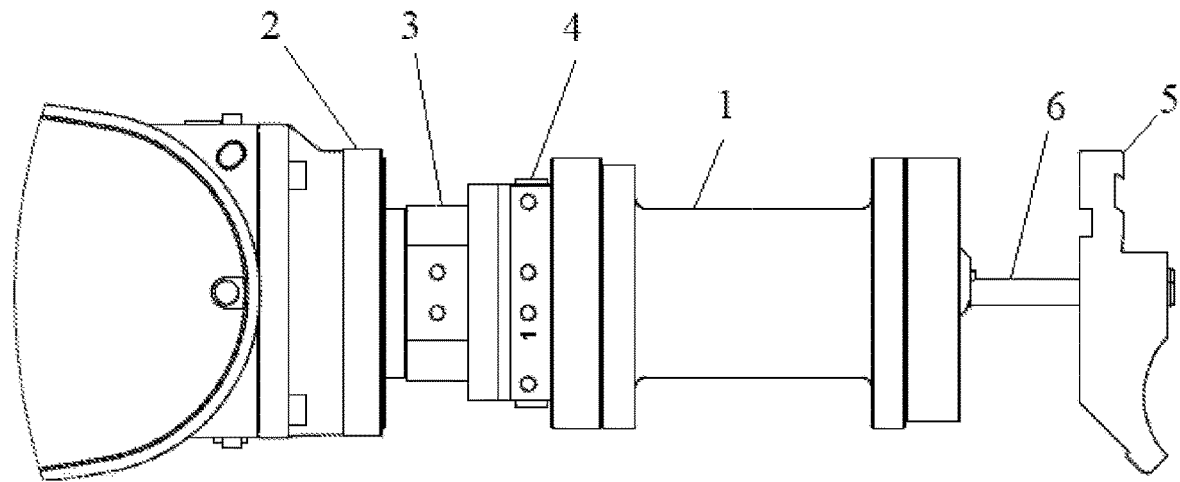

FIG. 1 displays the side view of the connection of the tool gripping device (1) comprising the invention to the robot (2). An adapter (3) on the robot-side is mounted to the robot arm (2), while an adapter (3) on the device-side is attached to the tool gripping device (1), wherein the two adapters (3 & 4) are interconnected. A bending tool (5) is secured to the gripper (6) extending out of the tool gripping device (1).

Figure 2:
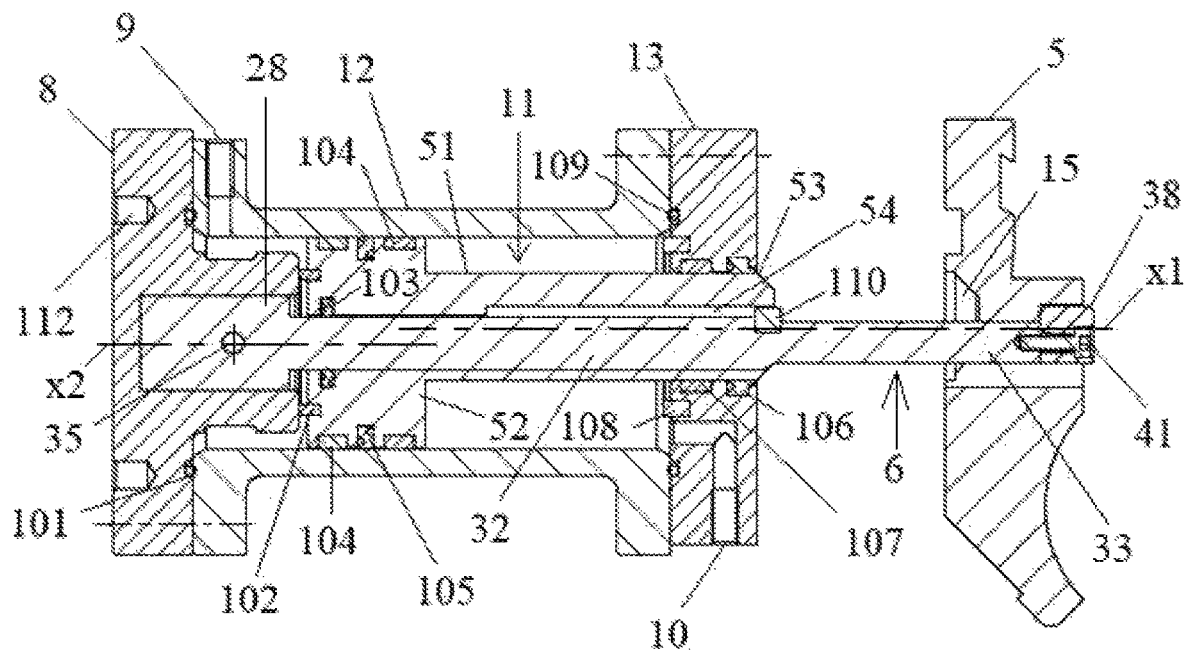

FIG. 2 displays the tool gripping device (1) and bending tool (5) in cross-section, in the position prior to the final mounting. The tool gripping device (1) has a cylindrical enclosure (12), one of the bases of which is secured to a similarly cylindrical base plate (8) with bolts (see FIGS. 4 and 5). The base has a compressed air connection (9), through which the enclosure (12) can be connected to the pneumatic equipment of the robot (2). A cylinder head (13) is clamped to the base at the other end of the enclosure (12) with bolts (see FIGS. 4 and 5). The cylinder head (13) also has a compressed air connection (10), through which the enclosure (12) can also be connected to the pneumatic equipment of the robot (2). O-rings (101 & 109) are installed between the enclosure (12) and the base plate (8), and between the enclosure (12) and the cylinder head (13), thereby ensuring that the inside of the enclosure (12) remains sealed.

A rod-shaped gripper (6) and a piston-shaped clamping element (11) are installed in the inside of the enclosure (12), consisting of a cylindrical clamp head (52) and a cylindrical clamp stem (51), which can slide along the enclosure (12) wall. Alternately controlled by a bilateral compressed air feed, the clamp (11) can be moved back and forth in a linear motion within the enclosure (12); its stroke extends out of the base plate (8) to the cylinder head (13) inside the enclosure (12).

The bending tool (5) is mounted to the end of the gripper (6) and is held firmly in place by the clamping element (11) actuated by the pneumatic equipment of the robot and impacting the tool in a form-locking manner.

Two guide strips (104) are installed into the skirt surface of the clamp head (52), and a sealing (105) is installed in the clamp head (52) skirt between them, ensuring the sealing of the inside of the enclosure (12) split by the clamp head (52). The function of the two guide strips (104) is to support the clamp head (52) and thereby prevent it from resting on the sealing (105). An impact pad (102) is installed in the front side of the clamp head (52), impacting the base plate (8) during the stroke triggered by the clamping element (11) releasing the bending tool (5). The rear side of the clamp head (52) strikes the impact pad (108) installed in the cylinder head (13) during the stroke triggered by the clamping element (11) clamping on the bending tool (5).

The cylindrical clamp stem (51) is led through the central aperture (64) of the cylinder head (13) (see FIG. 8), and is fitted with a conical end (53) which is form-fitted to the conical seat (15) to be implemented on the bending tool (5), and protrudes from the cylinder head (13). The position of the clamp stem (51) is eccentric to the clamp head (52); the centreline $x_2$ of the clamp stem (51) is not identical to the centreline $x_1$ of the clamp head (52), the enclosure (12) and the base plate (8). A centreline $x_1$ drill hole (54) goes through the clamping element (11), wherein the location of said drill hole (54) is symmetrical to the clamp head (52), but non-symmetrical to the clamp stem (51). A groove (55) is formed (see FIG. 9 as well) in the drill hole (54), the length of which corresponds to the stroke length calculated from the conical end (53) of the clamp stem (51); its function will be described in a later stage.

When gripping the bending tool (5), the clamp stem (51) extends out of the cylinder head (13) towards the direction of the bending tool (5), which is provided by the guide strip (107) installed in the cylinder head (13) supporting the clamp stem (51). The sealing of the cylinder head (13)—which is pressurized when the clamping element (11) is retracted—is ensured by the sealing retainer ring (106) installed in said cylinder head (13).

Drill holes (112) are drilled on the base plate (8) to accommodate the locating pins of the adapter (3) on the device side. The rod-like gripper (6) for connecting the bending tool (5), consisting of the clamp shank (28), the support stem (32) and the grip stem (33), is installed in the base plate (8). The clamp shank (28) is secured to the base plate (8) and positioned with a locating pin (30) (see FIGS. 4 and 5), with a drill hole (35) extending through it, as indicated on the clamp shank (28) in FIG. 2. The circular cross-section support stem (32) is led through the drill hole (54) of the clamp stem (51), and continues in the smaller diameter circular cross-section grip stem (33). The grip stem (33) extends out of the cylinder head (13), with a support head (38) affixed to its end via a recessed head bolt (41), which is required for gripping the bending tool (5).

A guide pin (110) is clamped in the grip stem (33) at the end of the support stem (32), which is seated in the groove (55) machined in the clamp stem (51) when the gripper (11) is pushed forward, ensuring the fixed position of the grip stem (33) when gripping the bending tool (5). A rod seal (103) is installed in the clamp head (52) sliding on the support stem (32) of the gripper (6), for the purpose of sealing the gap between the connecting surfaces.

Figure 3:
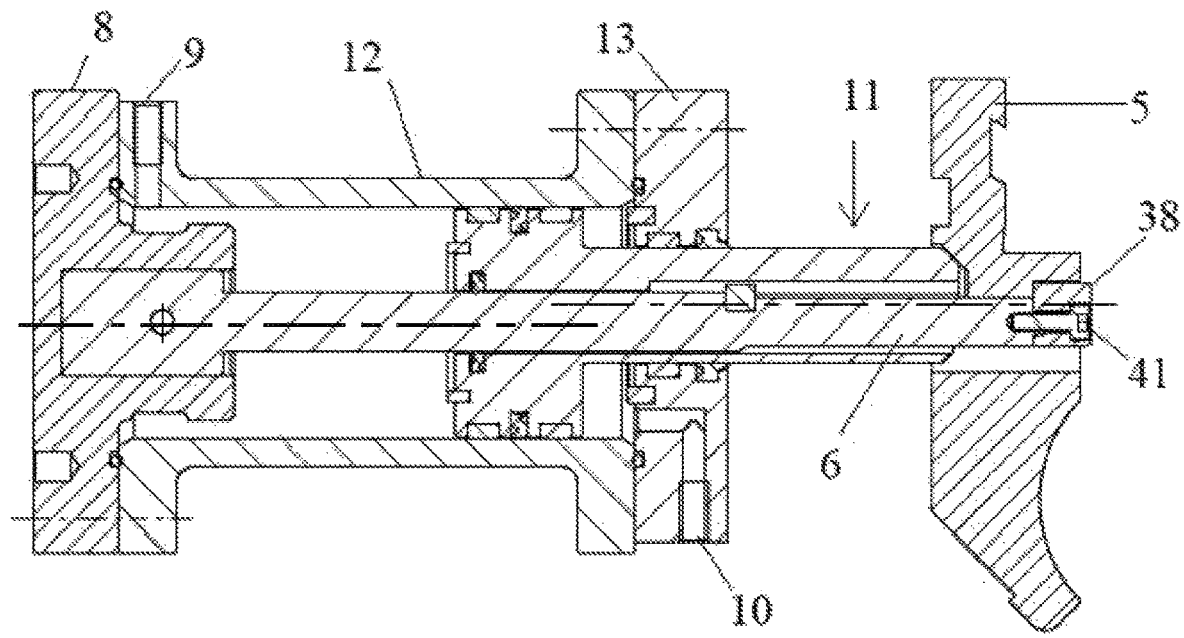

FIG. 3 indicates the tool gripping device (1) and the bending tool (5) in their final securing position, in cross-section view. The bending tool (5) is mounted to the end of the gripper (6) by the support head (38) impacting the inside space, via a recessed head bolt (41). The compressed air supplied into the enclosure (12) through the compressed air connection (9) pushes the clamping element (11) out of the enclosure (12) and presses it into the conical seat (15) of the bending tool (5) in a form-locking manner (indicated in FIG. 2), whereby the bending tool (5) is firmly secured to the gripper (6) by means of bilateral impacting.

Figure 4:
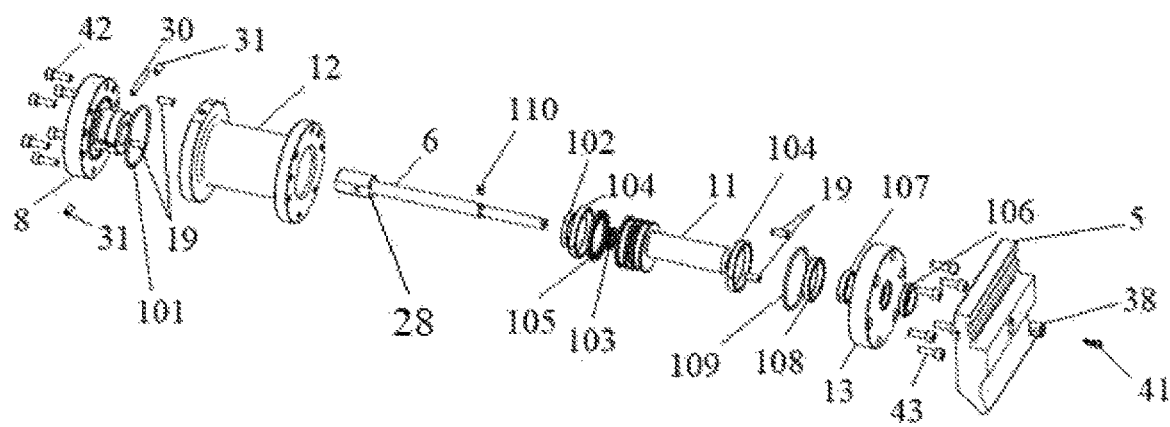
Figure 5:
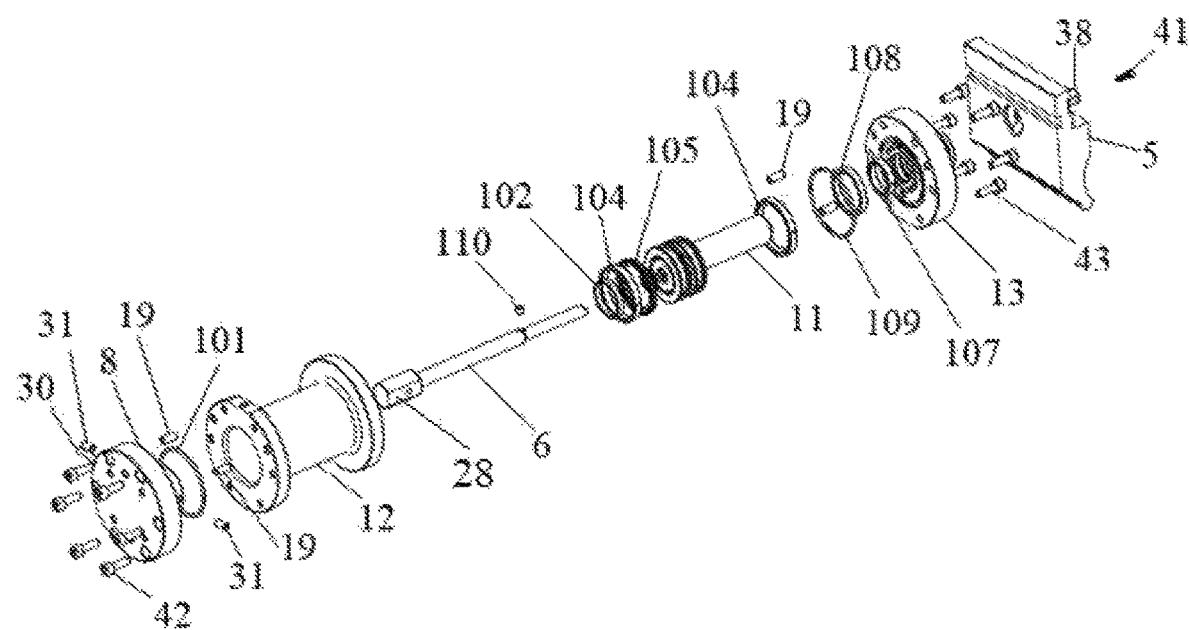

FIGS. 4 and 5 display the structural parts of the tool gripping device (1) in exploded view, displayed in two different viewing directions.

As indicated in the figures, the base plate (8) is mounted to the enclosure (12) with bolts (42). The correct positioning of the base plate (8) and the enclosure (12) is shown by two locating pins (19) inserted into the seats of the base plate (8) and the enclosure (12). The surfaces to be clamped can be oriented in the same way by means of two locating pins (19) during the coupling of the cylinder head (13) to the enclosure (12) with bolts (43).

The clamp shank (28) of the gripper (6) is secured to the base plate (8) with the locating pin (30) pushed through its drill hole (35) (see FIG. 3), which is fastened by stud bolts (31) screwed into the base plate (8).

Figure 6:
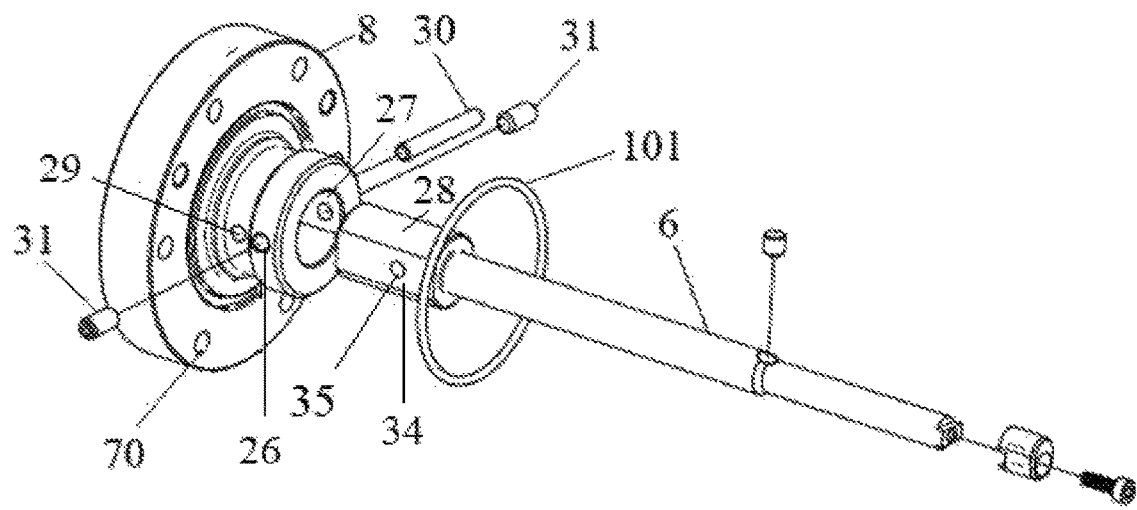

FIG. 6 displays the connection between the base plate (8) and the gripper (6). Drill holes (70) are drilled through the base plate (8) for the purpose of using bolts (42) to secure it to the enclosure (12) (see FIGS. 4 and 5); in addition, a cavity (27) is also available for receiving the clamp shank (28) of the gripper (6). The clamp shank (28) inserted into the cavity (27) can be secured on the spliced surfaces (34) with stud bolts (31) screwed into the threaded drill holes (29) of the base plate (8). The drill hole (26) drilled through the base plate and the drill hole (35) drill through the clamp shank (28) are used to accommodate the locating pin (30) which determines the position of the gripper (6) in the enclosure (12). The figure indicates the O-ring (101) which functions as sealing between the coupled enclosure (12) and the base plate (8).

Figure 7:
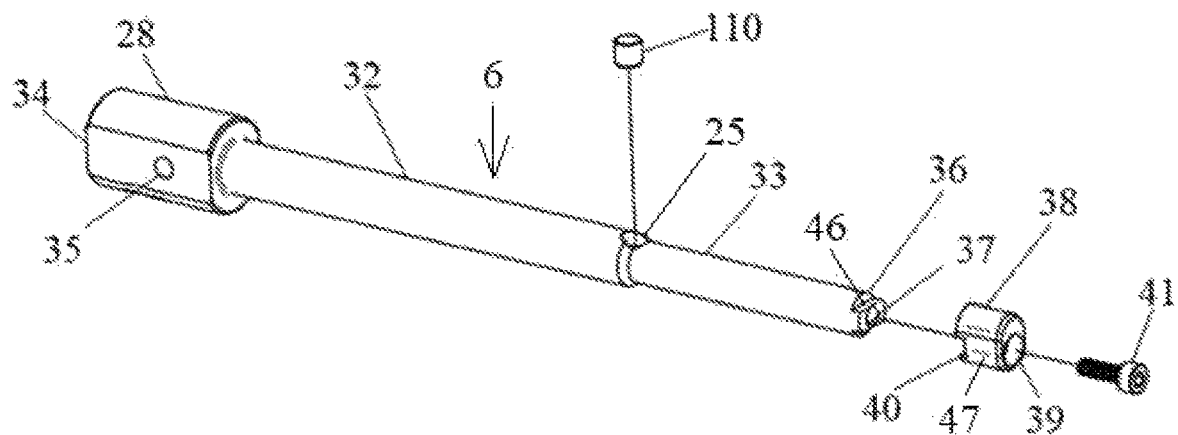

FIG. 7 indicates the parts of the gripper (6), the bilaterally spliced (34) clamp shank (28) with a drill hole (35) through it, the circular cross-section support stem (32), the similarly circular cross-section grip stem (33) and the support head (38) to be secured with the recessed-head bolt (41) at the end of the gripper (6). A drill hole (25) was drilled through the grip stem (33) for the guide pin (110) at the junction point of the support stem (32) and the grip stem (33), which is located in the groove (55) of the clamp stem (51), ensuring that the grip stem (33) remain in a stable, non-rotating position when gripping of the bending tool (5).

The bilaterally spliced (47) oval support head (38) has an eccentrically arranged drill hole (39) drilled for the bolt (41), parallel to its longitudinal axis; in addition, it is furnished with a traversing groove (40) to accommodate the projection (46) at the end of the grip stem (33) with the threaded drill hole (37) to receive the bolt (41). Above and below the projection (46), the grip stem (33) is spliced (36), with the splicings contacting the front side of the secured support head (38) when securing the support head (38).

Figure 8:
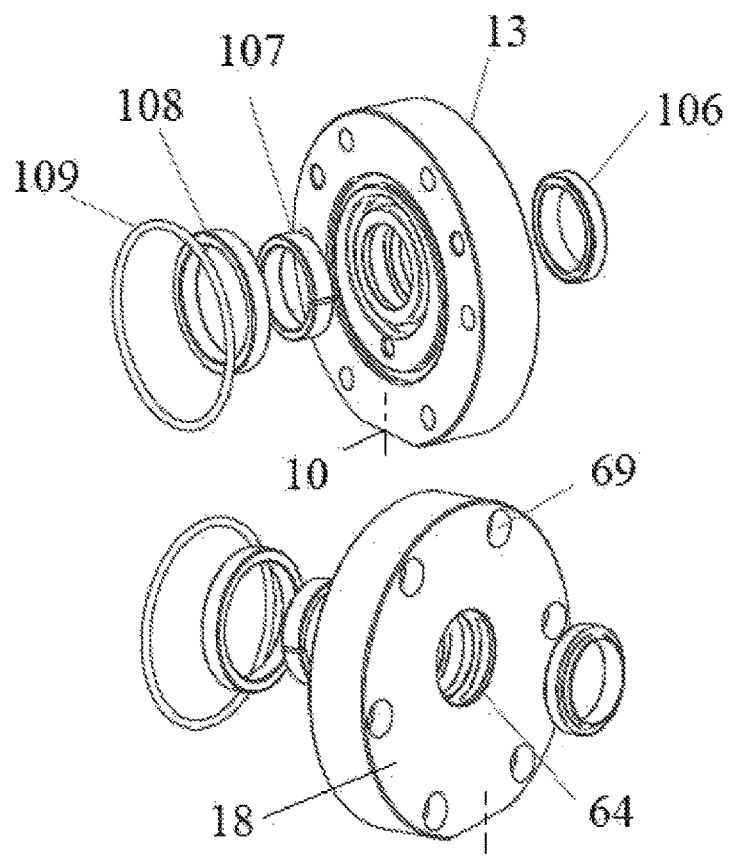

The cylinder head (13) presented in FIG. 8 has a central aperture (64) for the clamp stem (51). The guide strip (107) supporting the clamp stem (51) and the sealing retainer ring (106) are installed in the aperture (64). An impact pad (108) is installed on the front surface (63) of the cylinder head (13), limiting the overtravel of the clamp head (52) of the clamping element (11) performing the clamping stroke. The figure also indicates the sealing O-ring (109) to be installed between the enclosure (12) and the cylinder head (13). The drill holes (69) drilled through the cylinder head (13) are used to receive the bolts (43) coupling the cylinder head (13) to the enclosure (12) (see FIGS. 4 and 5).

Figure 9:
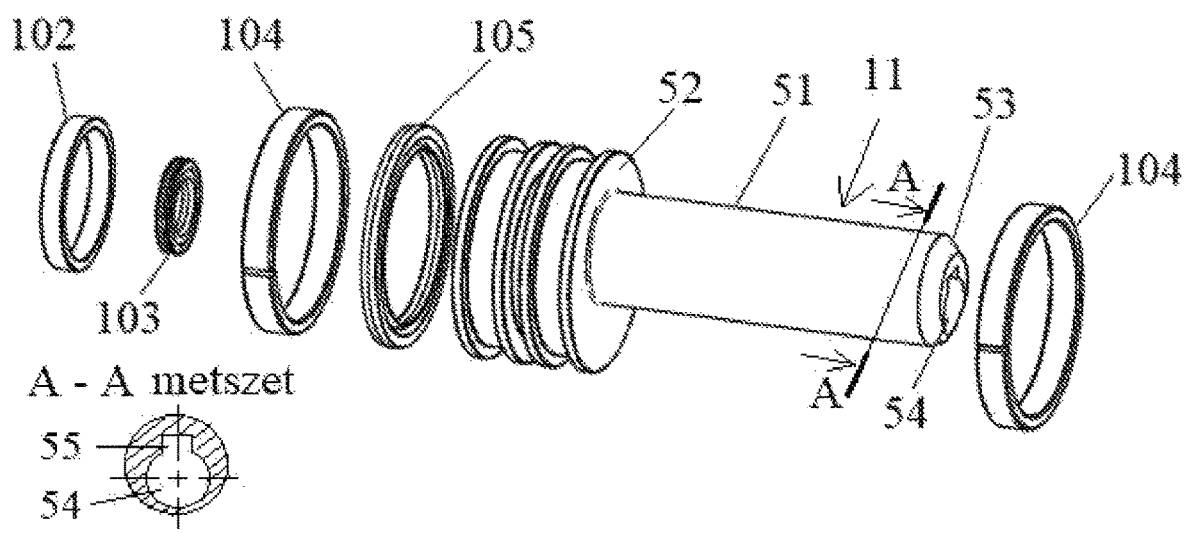

FIG. 9 displays the parts of the clamping element (11). The eccentrically arranged drill hole (54) is displayed at the conical end (53) of the clamp stem (51), which is supplemented with the groove (54) for accommodating the guide pin (104) as shown in FIG. 7. The figure displays the guide strips (104) supporting the clamp head (52) and the sealing (105) of the skirt surface, along with the impact pad (102) installed in the face plate of the clamp head (52) and the rod seal (103) installed in the drill hole (54) for sealing the support stem (32).

Figure 10:
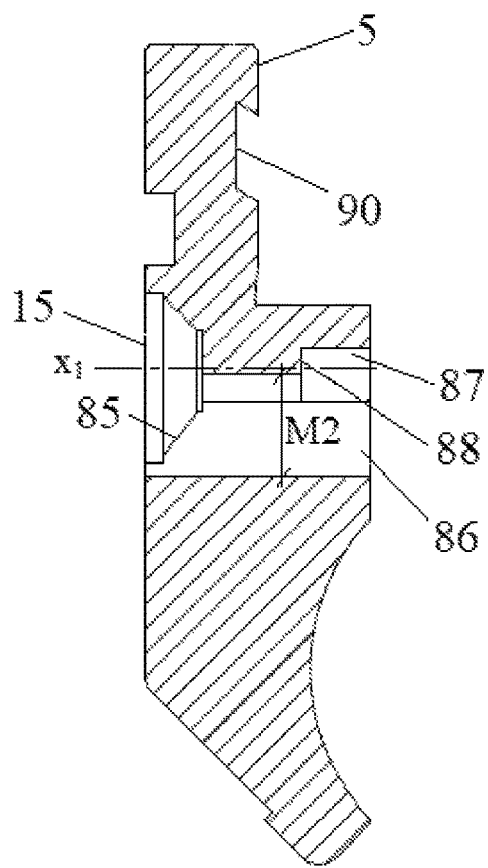
Figure 11:
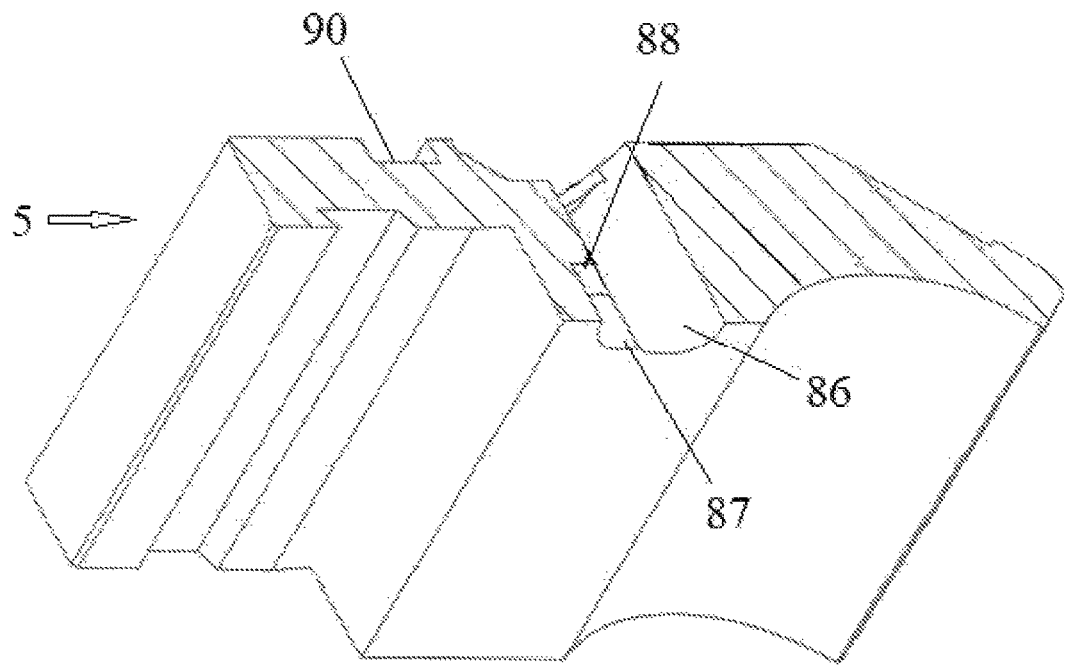
Figure 12:
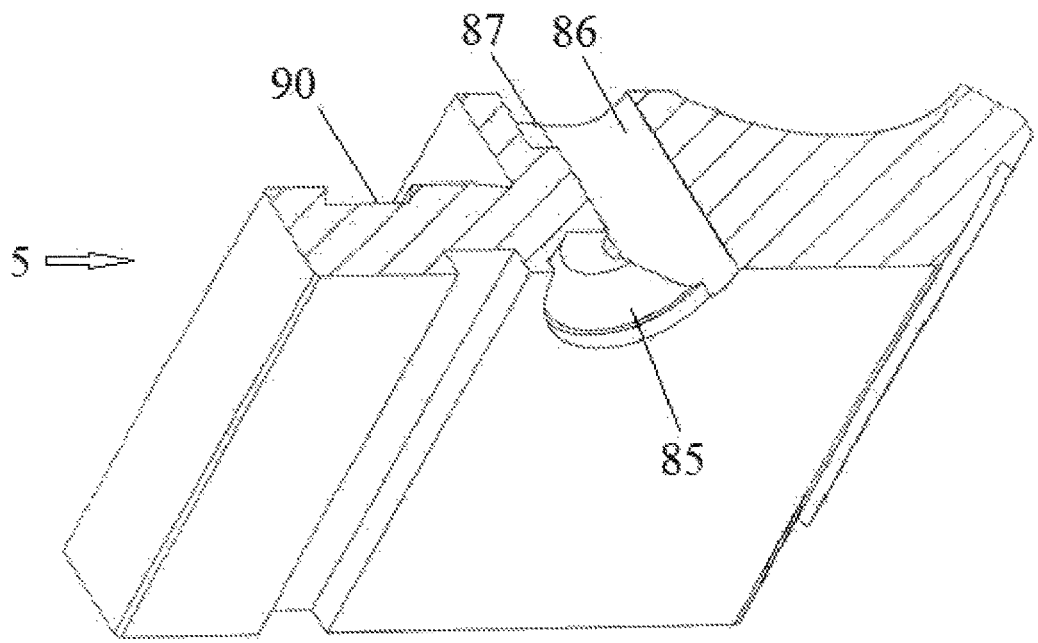
Figure 13:
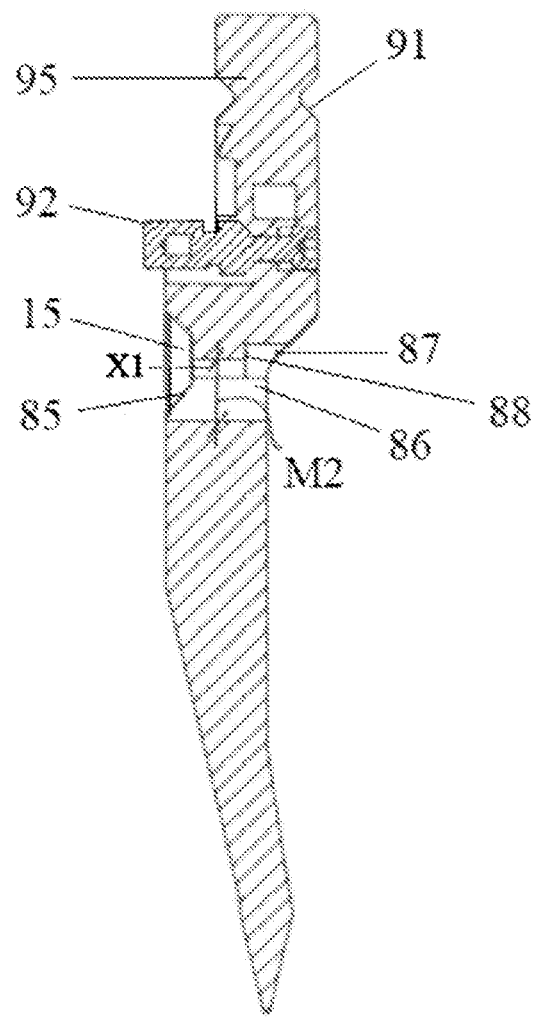

FIGS. 10 to 12 indicate the sectional and perspective views of one of the implementation designs of the bending tool, whereas FIG. 13 displays a different design for the bending tool.

FIGS. 10 to 12 display several views of the gripping location to be implemented on a commercially available bending tool (5). An $x_1$ centreline conical seat (15) (see FIG. 2) shall be implemented for receiving the conical end (53) of the clamping element (11) on one side of the bending tool (5), with an oval drill hole (87) equivalent with the length and height of the oval support head (38) to be drilled on the other side, the shape of which shall match the cross-sectional design of the support head (38). Subsequently, a oval drill hole (86) shall be drilled, which must be wider than the support head (38) and having an M2 height that likewise exceeds the support head's (38) height, allowing the support head (38) to be pushed through and impacted easily to the flange (88) at the end of the oval drill hole (87). The drill hole (87) shall be positioned so as to have the centreline $x_1$ pass through the flange (88).

The factory-made clamping groove (90) is used to adjust the position of the bending tool (5) at the tool clamp of the bending machine.

The other bending tool (95) displayed in FIG. 13 is equipped with one or two factory-made spring pins (92) and clamping grooves (91). The function of the spring pin (92) is to prevent the bending tool (95) from falling out of the tool holder of the bending machine before the hydraulic system of the tool holder has locked the position of the bending tool (95) in the tool holder. The manufacturer usually supplies wide tools with two spring pins (92), in order to allow them to rest on two surfaces in the tool holder. The spring pins (92) can also be pressed ('clicked') manually.

The design of the clamping locations of the bending tool (95) is identical to the descriptions in FIGS. 10 to 12.

Figure 14:
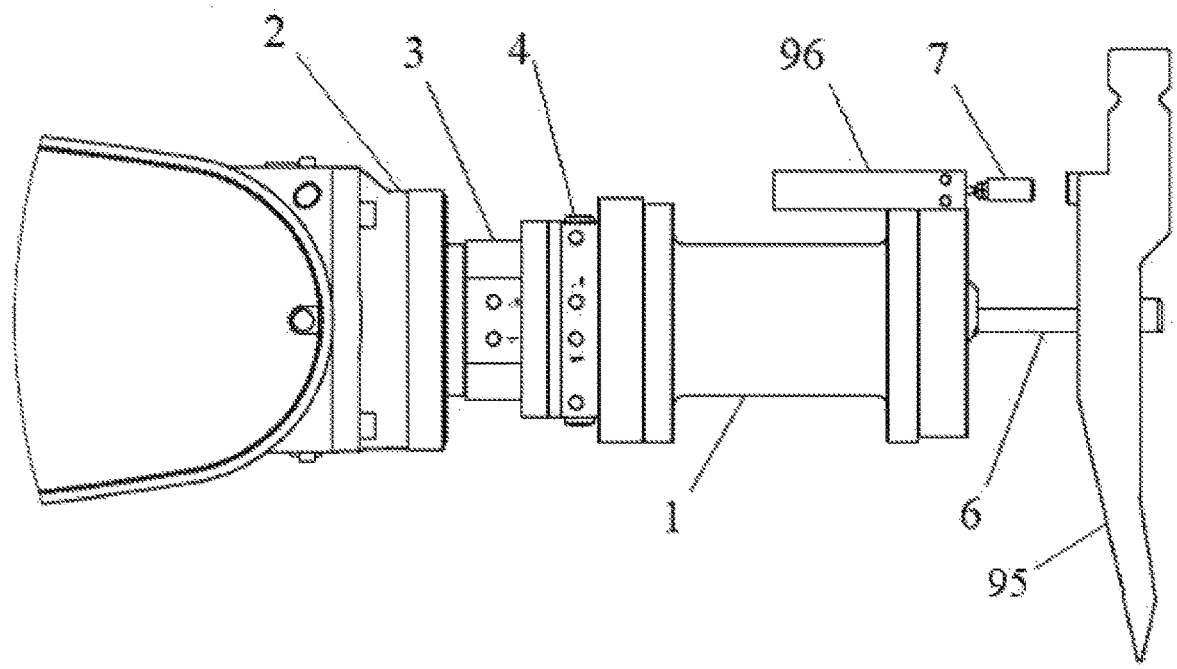

FIG. 14 displays a different implementation design of the tool gripping device (1) connected to the robot (2) with an adapter on the robot side (3) and an adapter on the gripper side (4), equipped with a pneumatic cylinder (96) with a pressure pin (7). The figure also indicates a bending tool (95) mounted on the gripper (6).

Figure 15:
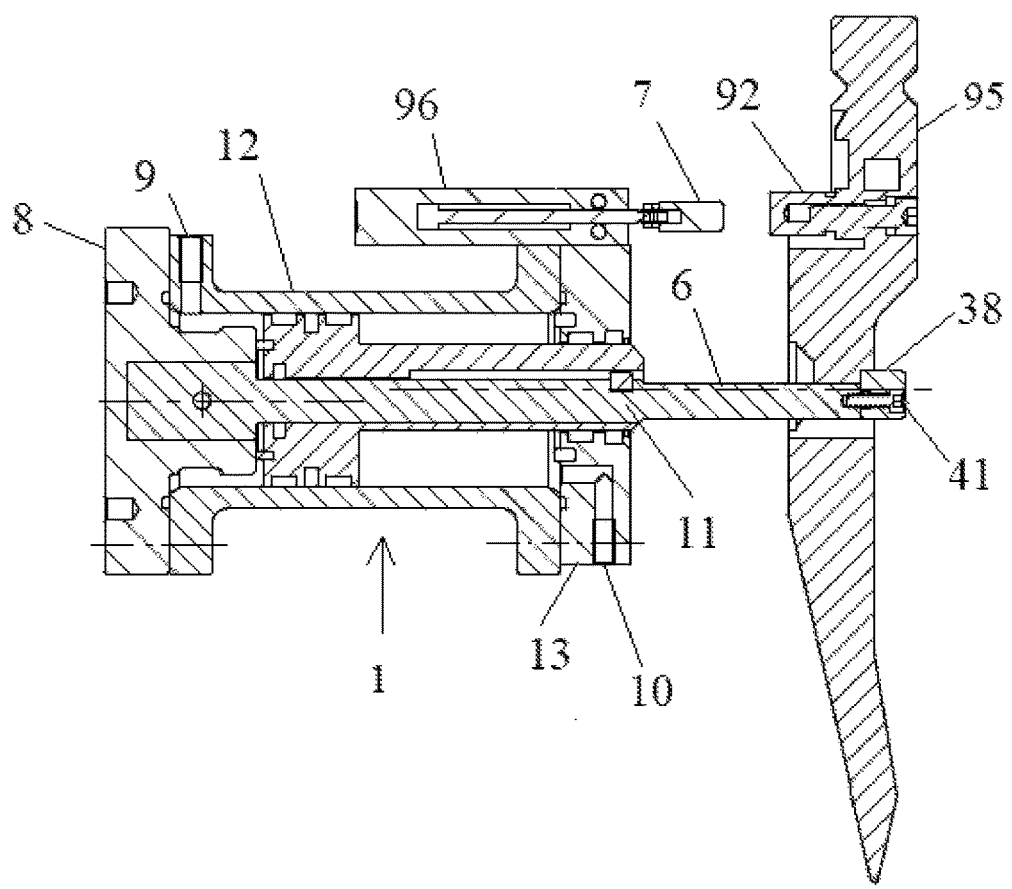

FIG. 15 displays the cross-section view of the tool gripping device (1) and the bending tool (95) in the position prior to their final securing. The tool gripping device (1) includes an enclosure (12), a base plate (8), a clamping element (11), a gripper (6), a cylinder head (13) and pneumatic connections (9 and 10); the arrangement of the structural parts corresponds to the descriptions in FIGS. 2 to 5. The new structural element is the pneumatic cylinder (96) installed on the cylinder head (13); the spring pin (92) of the bending tool (95) impacting the support head (38) secured to the gripper (6) with recessed-head bolts (41) is located facing the pressure pin (7) of the pneumatic cylinder (96). When the conical end (53) of the clamping element (11) is pushed into the conical seat (15) of the bending tool (95) and locks the bending tool (95) firmly onto the gripper (6), the spring pin (92) shall be pressed with the pressure pin (7) of the pneumatic cylinder (96), thus releasing its lock. The bending tool (95) can then be inserted into or removed from the tool clamp of the bending machine.

Figure 16:
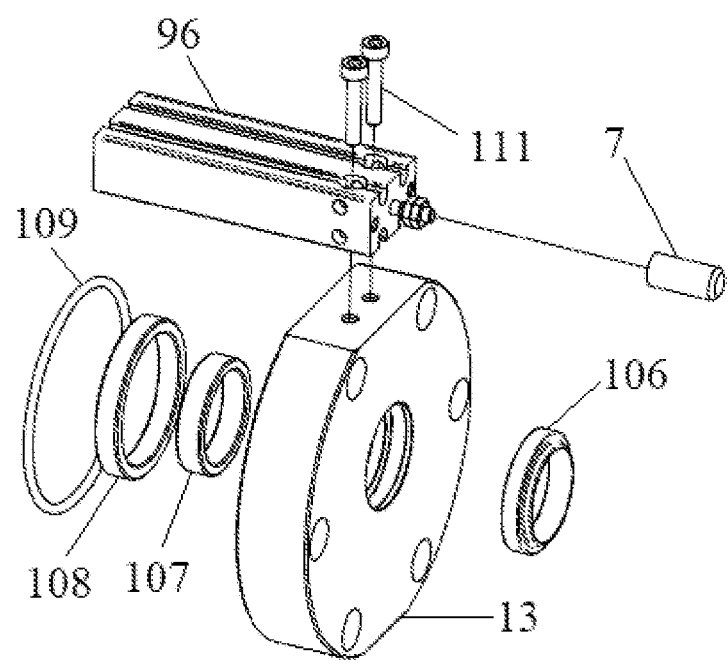

The pneumatic cylinder (96) with the pressure pin (7) is secured to the cylinder head (13) with bolts (111), as displayed in FIG. 16. The figure also displays the aforementioned accessories of the cylinder head (13), including the sealing retainer ring (106), the guide strip (107), the impact pad (108) and the O-ring (109).

For using the tool gripping device (1), the oval drill hole (86) going through the bending tool (5 & 95) supplemented with appropriate oval machining matching the shape of the support head (38) on one side of the tool required for clamping shall be drilled on the commercially available "raw" bending tool (5 & 95), while the conical seat (15) shall be installed on the other side of the bending tool (5 & 95). To have the robot move the bending tool (5 & 95), the tool gripping device (1) shall be connected to the robot arm with the adapter (3) on the robot side and the adapter (4) on the tool side. The grip stem (33) of the tool gripping device (1) equipped with support head (38) shall be inserted into the oval drill hole (86) drilled through the tool in such a way that it impacts the flange (88) shaped with oval machining to match the shape of the support head (38) as a support surface; next, the clamp stem (51) with a conical end (53) shall be pressed into the conical seat (15) of the bending tool (5 & 95) in a form-locking manner, and secured against the support head (38) that has been impacted on the flange (88) on the other side of the bending tool (5 & 95). This allows the tool gripping device (1) to firmly grip the bending tool (5 & 95).

Next, by controlling the tool gripping device (1) with the robot, the bending tool (5 & 95) is removed from its location and lifted over to the tool clamp of the bending machine in such a way as to allow the robot to position the clamping groove (90 & 91) of the bending tool (5 & 95) in the tool clamp. Having gripped the bending tool (5 & 95) in the tool clamp, retract the clamp stem (51) of the device into the enclosure (12) by means of compressed air, then pull the grip stem (33) out of the bending tool (5 & 95) by moving the support head (38) outward from the oval drill hole (86) of the bending tool (5 & 95).

The advantage of the tool comprising the invention is that it is independent of the bending tool's gripping system. Therefore, in addition to its use in the applied American system, it is also suitable for having robots grip bending tools of various makes and designs in other custom systems.

REFERENCES MARKS

1—tool gripping device
2—robot arm
3—robot-side adapter
4—device-side adapter
5—bending tool
6—gripper
7—pressure pin
8—base plate
9—compressed air connection
10—compressed air connection
11—clamping element
12—enclosure
13—cylinder head
14—conical seat
19—locating pin
20—drill hole
26—drill hole
27—cavity
28—clamp shank
29—drill hole
30—locating pin
31—stud bolt
32—support stem
33—grip stem
34—splicing
35—drill hole
36—splicing
37—drill hole
38—support head
39—drill hole
40—groove
41—recessed-head screw
42—bolt
43—bolt
46—projection
47—splicing
51—clamp stem
52—clamp head
53—conical seat
54—drill hole
55—groove
63—front surface
64—aperture
69—drill hole
70—drill hole
85—conical frustum surface (tool)
86—oval drill hole (tool)
87—oval drill hole (tool)
88—flange (tool)
90—clamping groove (tool)
91—clamping groove (tool)
92—spring pin (tool)
95—bending tool
96—pneumatic cylinder
100—device
101—O-ring 102—impact pad
103—rod seal
104—guide strip
105—sealing
106—sealing retainer ring
107—guide strip
108—impact pad
109—O-ring
110—guide pin
111—bolt
112—drill hole
M2—height
x1, x2—centre line

The invention claimed is:

1. A tool gripping device for gripping a bending tool with a robot equipped with a cylindrical enclosure (12) coupled to a base plate (8) comprising:
the enclosure (12) furnished with a compressed air connection (9),
a cylinder head (13) furnished with a compressed air connection (10) attached to an end of the enclosure (12) opposite the base plate (8),
a clamping element (11) movable by means of compressed air is arranged in the enclosure (12), with a conical end (53) of the clamping element (11) extending out of the enclosure (12) through an aperture (64) of the cylinder head (13),
a gripper (6) is led through hole (54) drilled through the clamping element (11), and a clamp shank (28) of which is secured to the base plate (8), with a support head (38) fixed eccentrically to an end of a grip stem (33) extending out of the clamping element (11).

2. The tool gripping device according to claim 1, wherein the gripper (6) comprises a support stem (32) connected to the clamp shank (28), and the grip stem (33) extending out of the support stem (32).

3. The tool gripping device according to claim 2, wherein the clamp shank (28) of the gripper (6) is clamped and secured inside a cavity (27) of the base plate (8).

4. The tool gripping device according to claim 2, wherein a drill hole (25) implemented in the grip stem (33) at a junction point of the support stem (32) and the grip stem (33), for the purpose of accommodating a guide pin (110).

5. The tool gripping device according to claim 2, further comprising a projection (46) with a threaded drill hole (37) at an end of the grip stem (33).

6. The tool gripping device according to claim 5, further comprising an oval support head (38) with bilateral splicing (47) having an eccentrically arranged groove (40) fitted to the projection (46).

7. The tool gripping device according to claim 6, further comprising an eccentrically arranged drill hole (39) going through the support head (38) parallel to its longitudinal axis and passing through the groove (40) for receiving a bolt (41) securing the support head (38) to the grip stem (33).

8. The tool gripping device according to claim 1, wherein the clamping element (11) comprises a cylindrical clamp head (52) arranged inside the enclosure (12) and a cylindrical clamp stem (51) led through aperture (64) of the cylinder head (13) eccentrically extending out of the clamp head (52).

9. The tool gripping device according to claim 8, wherein a drill hole (54) going through the clamping element (11) concentric to the clamp head (52), which is paired with a groove (55) accommodating a guide pin (110) installed in the grip stem (33) of the gripper (6) on a section of the clamp stem (51).

10. The tool gripping device according to claim 8, wherein guide strips (104) sliding on an inside wall of the enclosure (12) are installed in a skirt surface of the clamp head (52).

11. The tool gripping device according to claim 8, wherein an impact pad (102) is installed in a front side of the clamp head (52) in a direction of the base plate (8).

12. The tool gripping device according to claim 1, wherein an impact pad (108) is installed in a front side of the cylinder head (13) inside the enclosure (12), and a guide strip (107) sliding on a wall of aperture (64) is installed in an aperture (64).

13. The tool gripping device according to claim 1, wherein a pneumatic cylinder (96) supplied with a pressure pin (7) is mounted on the cylinder head (13).

* * * * *